US011758985B2

(12) United States Patent
Kohatsu et al.

(10) Patent No.: US 11,758,985 B2
(45) Date of Patent: Sep. 19, 2023

(54) METHOD OF APPLYING OUTSOLE TO AN ARTICLE OF FOOTWEAR

(71) Applicant: NIKE, Inc., Beaverton, OR (US)

(72) Inventors: Shane S. Kohatsu, Portland, OR (US); Jill D. Murfin, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 449 days.

(21) Appl. No.: 16/857,497

(22) Filed: Apr. 24, 2020

(65) Prior Publication Data
US 2020/0337419 A1 Oct. 29, 2020

Related U.S. Application Data

(60) Provisional application No. 62/839,310, filed on Apr. 26, 2019.

(51) Int. Cl.
A43D 35/00 (2006.01)
B29D 35/00 (2010.01)
B29D 35/14 (2010.01)
B29K 75/00 (2006.01)

(52) U.S. Cl.
CPC ......... *A43D 35/00* (2013.01); *B29D 35/0054* (2013.01); *B29D 35/142* (2013.01); *B29K 2075/00* (2013.01)

(58) Field of Classification Search
CPC .............. B29C 41/365; B29C 41/36; B29C 2033/3864; B29C 43/203; B29C 43/184; B29C 43/183; B29C 43/18; B29C 2043/147; B29C 43/00; B29D 35/142; B29D 35/122; B29D 35/0054; A43D 35/00
See application file for complete search history.

(56) References Cited

U.S. PATENT DOCUMENTS

| 4,418,483 A | 12/1983 | Fujita et al. |
| 6,749,781 B1 | 6/2004 | Maurer |
| 2004/0000255 A1 | 1/2004 | Hernandez |
| 2005/0217148 A1* | 10/2005 | Connolly ............... A43B 13/04 36/30 R |
| 2008/0193774 A1 | 8/2008 | Stone et al. |

(Continued)

FOREIGN PATENT DOCUMENTS

| CN | 2197851 Y | 5/1995 |
| CN | 102922762 A | 2/2013 |

(Continued)

OTHER PUBLICATIONS

Taiwan Patent Office, Office Action for Application No. 109113911 dated Jun. 7, 2021.

(Continued)

*Primary Examiner* — Stella K Yi
(74) *Attorney, Agent, or Firm* — Honigman LLP; Matthew H. Szalach; Jonathan P. O'Brien

(57) ABSTRACT

A method of forming a sole structure for an article of footwear. The method includes depositing a first outsole material including a first uncured polymeric material upon a mold surface of a mold cavity. The method also includes disposing a midsole element adjacent to the first outsole material within the mold cavity and subjecting the first outsole material and the midsole element to a molding process to form the sole structure having an outsole and a midsole.

18 Claims, 7 Drawing Sheets

(56) References Cited

U.S. PATENT DOCUMENTS

| | | | |
|---|---|---|---|
| 2010/0076143 A1* | 3/2010 | Yakulis | C09D 175/02 528/367 |
| 2013/0126075 A1* | 5/2013 | Jiang | A43B 13/122 156/581 |
| 2015/0096195 A1 | 4/2015 | Bacon et al. | |
| 2015/0366289 A1 | 12/2015 | Rustam et al. | |

FOREIGN PATENT DOCUMENTS

| | | | |
|---|---|---|---|
| CN | 106103035 A | | 11/2016 |
| DE | 2851390 A1 | | 6/1980 |
| EP | 3078290 A1 | | 10/2016 |
| GB | 2076725 A | | 12/1981 |
| JP | 2002085105 A | | 3/2002 |
| KR | 1998314 | * | 9/2019 |
| WO | WO2015200103 | * | 12/2015 |

OTHER PUBLICATIONS

Taiwan Patent Office, Office Action for Application No. 109113910 dated Jun. 7, 2021.

European Patent Office (ISA), International Search Report and Written Opinion for PCT Application No. PCT/US2020/029743, dated Jul. 10, 2020.

European Patent Office (ISA), International Search Report and Written Opinion for PCT Application No. PCT/US2020/029757, dated Jul. 23, 2020.

China National Intellectual Property Administration, First Office Action for CN App. No. 202080031657.8, dated Oct. 31, 2022.

United States Patent and Trademark Office, Non-Final Office Action for U.S. Appl. No. 16/857,572 dated Jan. 20, 2022.

China National Intellectual Property Administration, Second Office Action for CN App. No. 202080031657.8, dated May 23, 2023.

* cited by examiner

METHOD OF APPLYING OUTSOLE TO AN ARTICLE OF FOOTWEAR

CROSS REFERENCE TO RELATED APPLICATIONS

This non-provisional U.S. patent application claims priority under 35 U.S.C. § 119(e) to U.S. Provisional Patent Application Ser. No. 62/839,310, filed Apr. 26, 2019, the disclosure of which is hereby incorporated by reference in its entirety.

FIELD

The present disclosure relates generally to sole structures for articles of footwear and more particularly to methods of applying outsoles to sole structures.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be at least partially formed of rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. The midsole may additionally or alternatively incorporate a fluid-filled bladder to increase durability of the sole structure, as well as to provide cushioning to the foot by compressing resiliently under an applied load to attenuate ground-reaction forces. Sole structures may also include a comfort-enhancing insole or a sockliner located within a void proximate to the bottom portion of the upper and a strobel attached to the upper and disposed between the midsole and the insole or sockliner.

DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
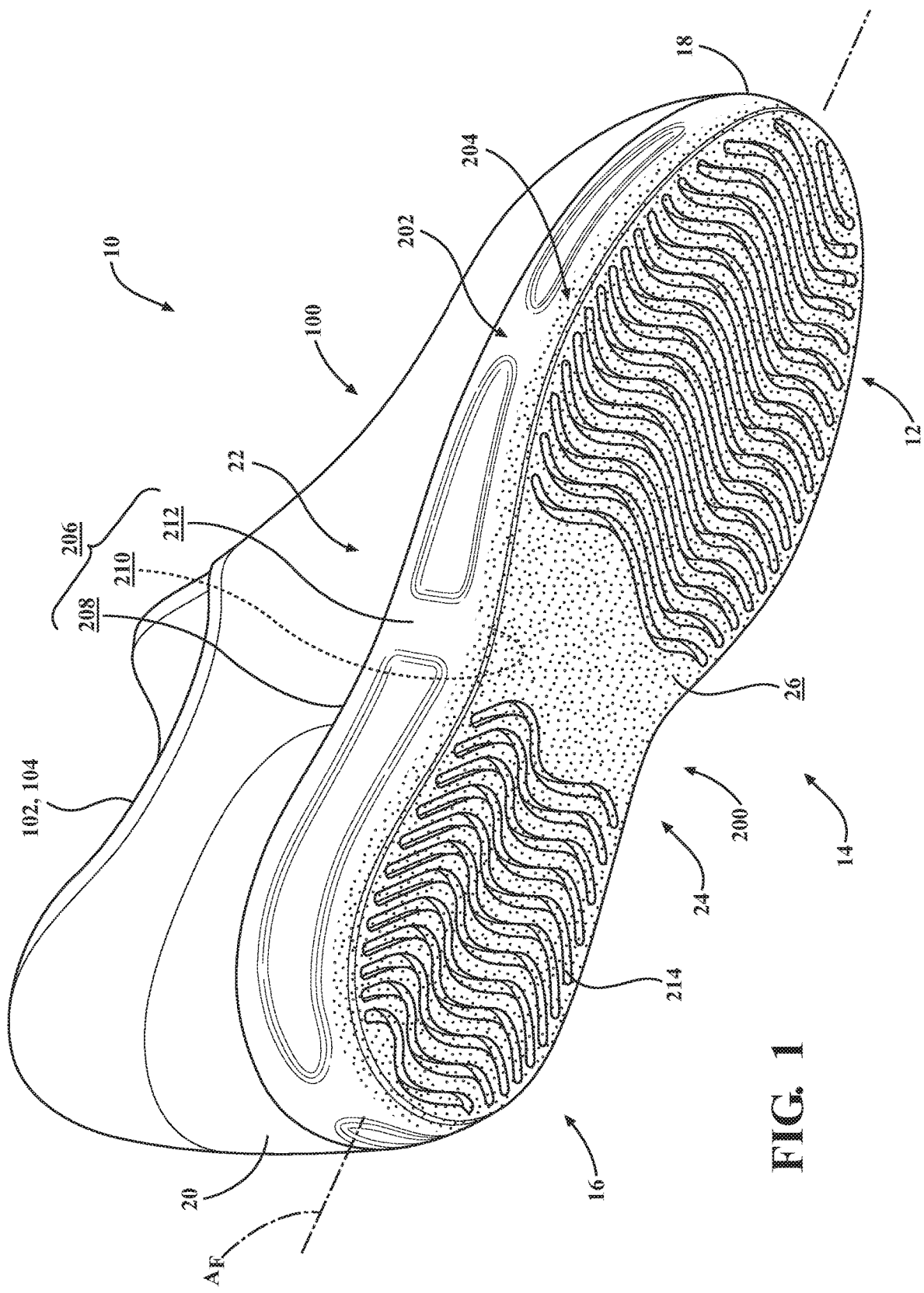
FIG. 1 is a perspective view of an article of footwear having a sole structure formed according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of forming a sole structure for an article of footwear. The method includes depositing a first outsole material including a first uncured polymeric material upon a mold surface of a mold cavity. The method also includes disposing a midsole element adjacent to the first outsole material within the mold cavity and subjecting the first outsole material and the midsole element to a molding process to form the sole structure having an outsole and a midsole.

Implementation of the disclosure may include one or more of the following optional features. In some implementations, depositing a first outsole material includes spraying a first outsole material upon the mold surface of the mold cavity.

In some examples, depositing a first outsole material includes depositing a first outsole material upon a bottom surface of the mold cavity.

In some configurations, the method includes depositing a second outsole material including a second uncured polymeric material within the mold cavity. The first uncured polymeric material may be different from the second uncured polymeric material. Depositing a third outsole material may include a particulate additive within the mold cavity. The first outsole material may be an uncured polyurethane.

In some implementations, the first outsole material may be an uncured polyurea. The midsole element may include a foamed polymeric material. The molding process may be a compression molding process.

Another aspect of the disclosure provides a method of forming a sole structure for an article of footwear. The method includes spraying a first outsole material including a first uncured polymeric material upon a mold surface of a mold cavity. The method also includes disposing a midsole element adjacent to the first outsole material within the mold cavity and subjecting the midsole element and the first outsole material to a molding process to form the first outsole material into an outsole and the midsole element into a midsole.

Implementation of the disclosure may include one or more of the following optional features. In some implementations, spraying a first outsole material includes spraying a first outsole material upon a bottom surface of the mold cavity.

In some implementations, spraying a second outsole material may include spraying a second uncured polymeric material within the mold cavity.

In some examples, the first uncured polymeric material may be different from the second uncured polymeric material. The method may include depositing a particulate additive within the mold cavity. The first outsole material may be an uncured polyurethane.

In some configurations, the first polymeric material may be polyurea. Further, the midsole element may include a foamed polymeric material. The midsole element may be a midsole preform. The molding process may be a compression molding process.

Referring to FIG. 1, an article of footwear 10 includes an upper 100 and sole structure 200. The article of footwear 10 may be divided into one or more regions. The regions may include a forefoot region 12, a mid-foot region 14, and a heel region 16. The forefoot region 12 corresponds with phalanges and metatarsal bones of a foot. The mid-foot region 14 may correspond with an arch area of the foot, and the heel region 16 may correspond with rear portions of the foot, including a calcaneus bone. The footwear 10 may further include an anterior end 18 associated with a forward-most point of the forefoot region 12, and a posterior end 20 corresponding to a rearward-most point of the heel region 16. A longitudinal axis $A_F$ of the footwear 10 extends along a length of the footwear 10 from the anterior end 18 to the posterior end 20, and generally divides the footwear 10 into a lateral side 22 and a medial side 24. Accordingly, the lateral side 22 and the medial side 24 respectively correspond with opposite sides of the footwear 10 and extend through the regions 12, 14, 16.

The upper 100 includes interior surfaces that define an interior void 102 configured to receive and secure a foot for support on sole structure 200. The upper 100 may be formed from one or more materials that are stitched or adhesively bonded together to form the interior void 102. Suitable materials of the upper may include, but are not limited to, mesh, textiles, foam, leather, and synthetic leather. The materials may be selected and located to impart properties of durability, air-permeability, wear-resistance, flexibility, and comfort.

In some examples, the upper 100 includes a strobel having a bottom surface opposing the sole structure 200 and an opposing top surface defining a footbed of the interior void 102. Stitching or adhesives may secure the strobel to the upper 100. The footbed may be contoured to conform to a profile of the bottom surface (e.g., plantar) of the foot. Optionally, the upper 100 may also incorporate additional layers such as an insole or sockliner that may be disposed upon the strobel and reside within the interior void 102 of the upper 100 to receive a plantar surface of the foot to enhance the comfort of the article of footwear 10. An ankle opening 104 in the heel region 16 may provide access to the interior void 102. For example, the ankle opening 104 may receive a foot to secure the foot within the void 102 and facilitate entry and removal of the foot from and to the interior void 102.

In some examples, one or more fasteners may extend along the upper 100 to adjust a fit of the interior void 102 around the foot and to accommodate entry and removal of the foot therefrom. The fasteners may include laces, straps, cords, hook-and-loop, or any other suitable type of fastener. The upper 100 may include a tongue portion that extends between the interior void 102 and the fasteners. While the upper 100 of the present disclosure is illustrated as an enclosed upper for a shoe, the principles of the present disclosure may be applied to other types of footwear having alternative styles of uppers, such as sandals and boots, for example.

With continued reference to FIG. 1, the sole structure 200 includes a midsole 202 configured to provide cushioning characteristics to the sole structure 200, and an outsole 204 configured to provide a ground-engaging surface 26 of the article of footwear 10. Unlike conventional sole structures where the outsole comprises one or more pre-formed polymeric layers that are mechanically or adhesively attached to a midsole, the outsole 204 of the present disclosure is initially provided to a mold as an uncured outsole material 204a then molded and cured simultaneously with the midsole element 202a to form a type of resilient skin coating over an exterior surface 206 of the midsole 202. Optionally, second and third outsole materials 204b, 204c may also be provided to the mold 302 to form additional layers and/or textures of the outsole 204.

The midsole 202 may be formed of one or more components selected to impart properties of cushioning and stability. In the illustrated example, the midsole 202 includes a unitary foam structure extending continuously from the anterior end 18 to the posterior end 20 of the article of footwear 10. However, in other examples the midsole 202 may be a composite structure having a plurality of foam support elements and/or fluid-filled bladders cooperating to form the midsole 202.

The exterior surface 206 of the midsole 202 may be described as including a top surface 208 configured to face the strobel of the upper 100 and defining a profile of the footbed of the interior void 102. A bottom surface 210 of the midsole 202 is formed on an opposite side from the top surface 208. A peripheral side surface 212 of the midsole extends from the top surface 208 to the bottom surface 210 and forms an outer peripheral profile of the sole structure 200. While the present disclosure shows the outsole materials 204a-204c being applied on the bottom surface 210 of the midsole 202, in other examples the outsole materials 204a-204c may be deposited at least partially onto the peripheral side surface 212 of the midsole 202, such that outsole 204 will extend over the midsole 202 when cured.

As described above, the midsole 202 includes a resilient polymeric material, such as foam or rubber, to impart properties of cushioning, responsiveness, and energy distribution to the foot of the wearer. In the illustrated example, the midsole 202 includes a single component formed of a single foam material. However, in other examples, the midsole 202 may include a plurality of foam components and/or may be formed of a plurality of foam materials to impart different performance properties to regions of the sole structure 200. For example, a first foam component may be formed of foam materials providing greater cushioning and impact distribution, while other foam components are formed of foam materials having a greater hardness in order to provide increased lateral stiffness.

Example resilient polymeric materials for the midsole 202 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some aspects, the one or more polymers may include olefinic homopolymers, olefinic copolymers, or blends thereof. Examples of olefinic polymers include polyethylene, polypropylene, and combinations thereof. In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further aspects, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further aspects, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further aspects, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further aspects, the one or more polymers may include one or more polyamide copolymers (e.g., polyamide-polyether copolymers) and/or one or more polyurethanes (e.g., crosslinked polyurethanes and/or thermoplastic polyurethanes). Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as adodicarbonamide, sodium bicarbonate, and/or an isocyanate.

In some embodiments, the foamed polymeric material may be a crosslinked foamed material. In these embodiments, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a crosslinking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold, and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened and the molded foam article is removed from the mold.

As discussed in greater detail below, the first outsole material 204a and the optional second outsole material 204b are initially provided to a mold cavity 304 in an uncured, fluid state, whereby a profile of the finished outsole 204 is then imparted and cured in a subsequent molding process. An optional third outsole material 204c may be provided to the mold cavity 304 in a cured, granular state. The outsole materials 204a-204c are selected to impart properties of wear-resistance, durability, and traction. In some examples, the outsole materials 204a-204c include an elastomeric material that has one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

Referring now to FIGS. 2A-2F, a method for forming the sole structure 200 according to the present disclosure is shown. In the illustrated example, one or more outsole materials 204a-204c are initially deposited within a mold cavity 304 of a mold 302. A midsole element 202a is then disposed within the mold cavity 304 adjacent to the one or more outsole materials 204a-204c and the mold 302 is closed. The outsole materials 204a-204c and the midsole element 202a are simultaneously molded under the effects of heat and pressure (i.e., compression molding) to form the sole structure 200 including the midsole 202 and the outsole 204.

Figure 2A:
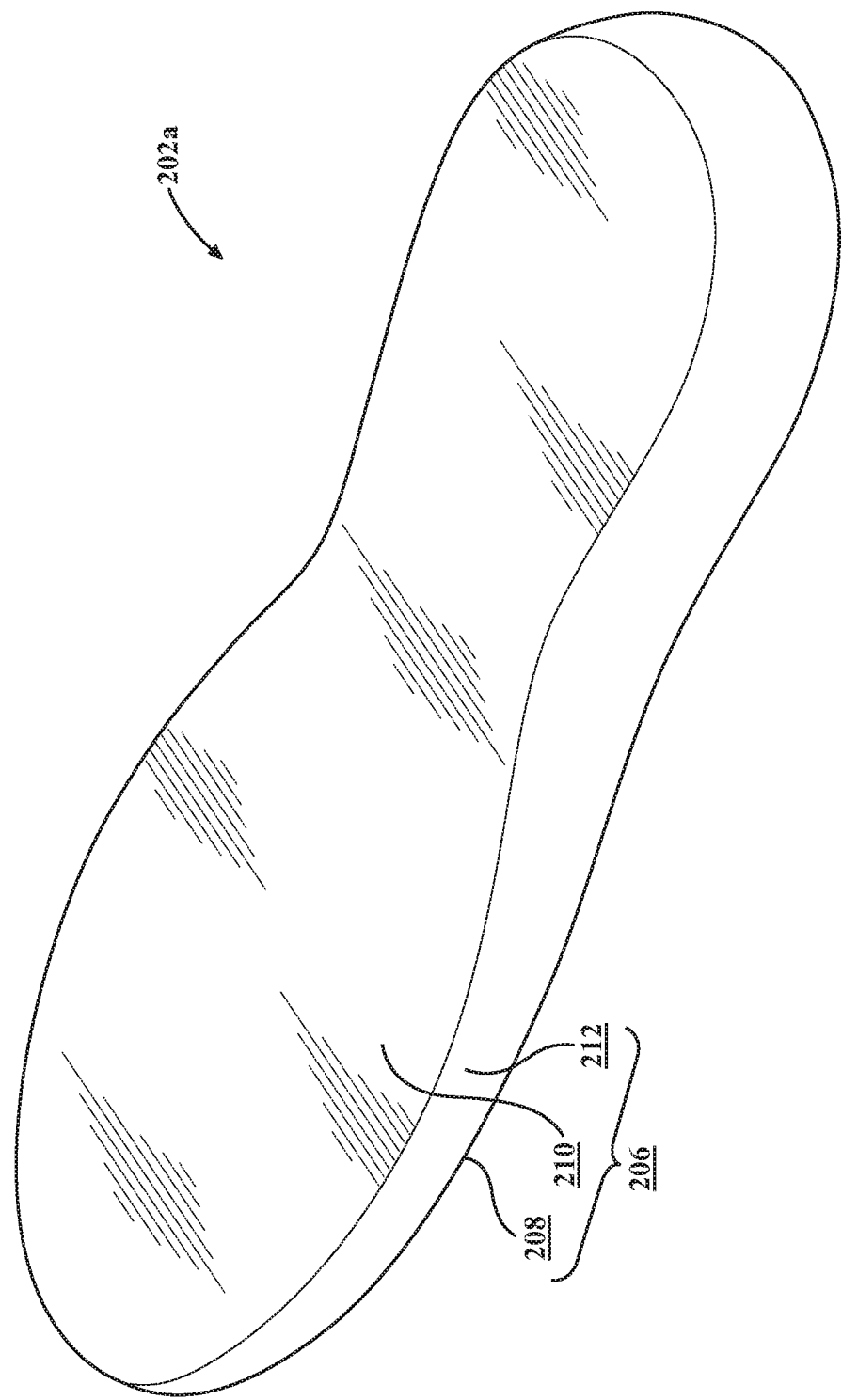
FIG. 2A is a perspective view of one step of a method of producing the sole structure of FIG. 1, showing a midsole preform prior to application of an outsole material.

With reference to FIG. 2A, the midsole element 202a is initially provided as a midsole preform 202a having a greater size (i.e., volume) than the final midsole 202. As discussed above, the midsole preform 202a is formed of a foamed polymeric material. The midsole preform 202a includes an exterior surface 206a including a top surface 208a and a bottom surface 210a formed on an opposite side of the midsole preform 202a from the top surface 208a. A peripheral side surface 212a extends from the top surface 208a to the bottom surface 210a and defines an outer peripheral profile of the midsole preform 202a. The surfaces 206a, 208a, 210a of the midsole preform 202a correspond to the molded surfaces 206, 208, 210 of the midsole 202.

Figure 2B:
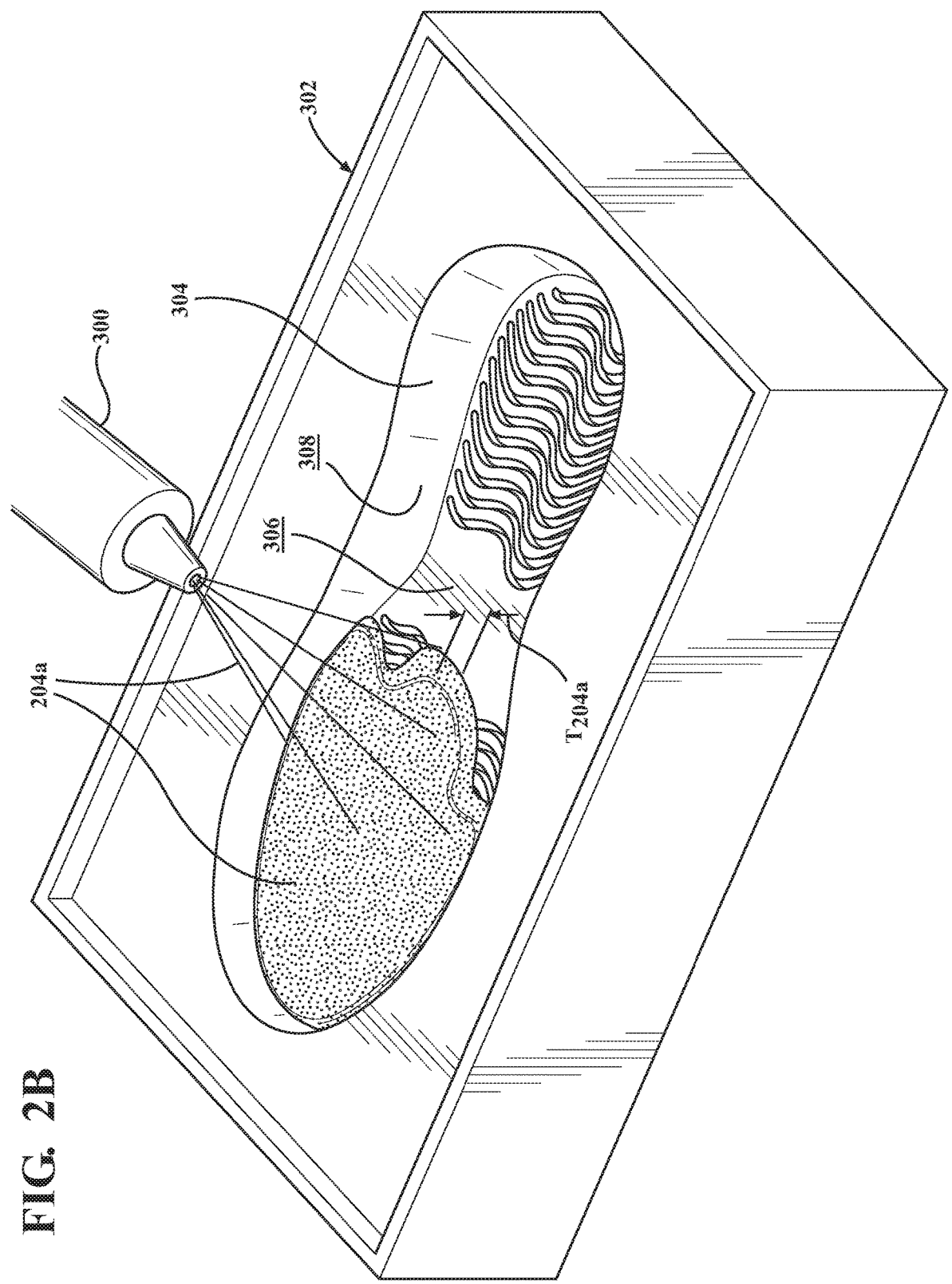
FIG. 2B is a perspective view of another step of the method of producing the sole structure of FIG. 1, showing a first outsole material being provided to a mold cavity.

In FIG. 2B, an applicator 300 is used to deposit the uncured first outsole material 204a within the mold cavity 304 of the mold 302. Here, the first outsole material 204a is initially deposited within the mold cavity 304 in an uncured, fluid state. In the illustrated example, the first outsole material 204a is provided as a continuous coating over the entire bottom surface 306 of the mold cavity 304. However, in instances where the molded outsole 204 is fragmented on the bottom surface 206 of the midsole 202, the first outsole material 204a may be applied in localized regions to form isolated patches of the first outsole material 204a within the mold cavity 304. For example, the first outsole material 204a may include a first portion associated with the forefoot region 12 and a second portion associated with the heel region 16, where the first portion and the second portion are separate from each other.

Figure 2C:
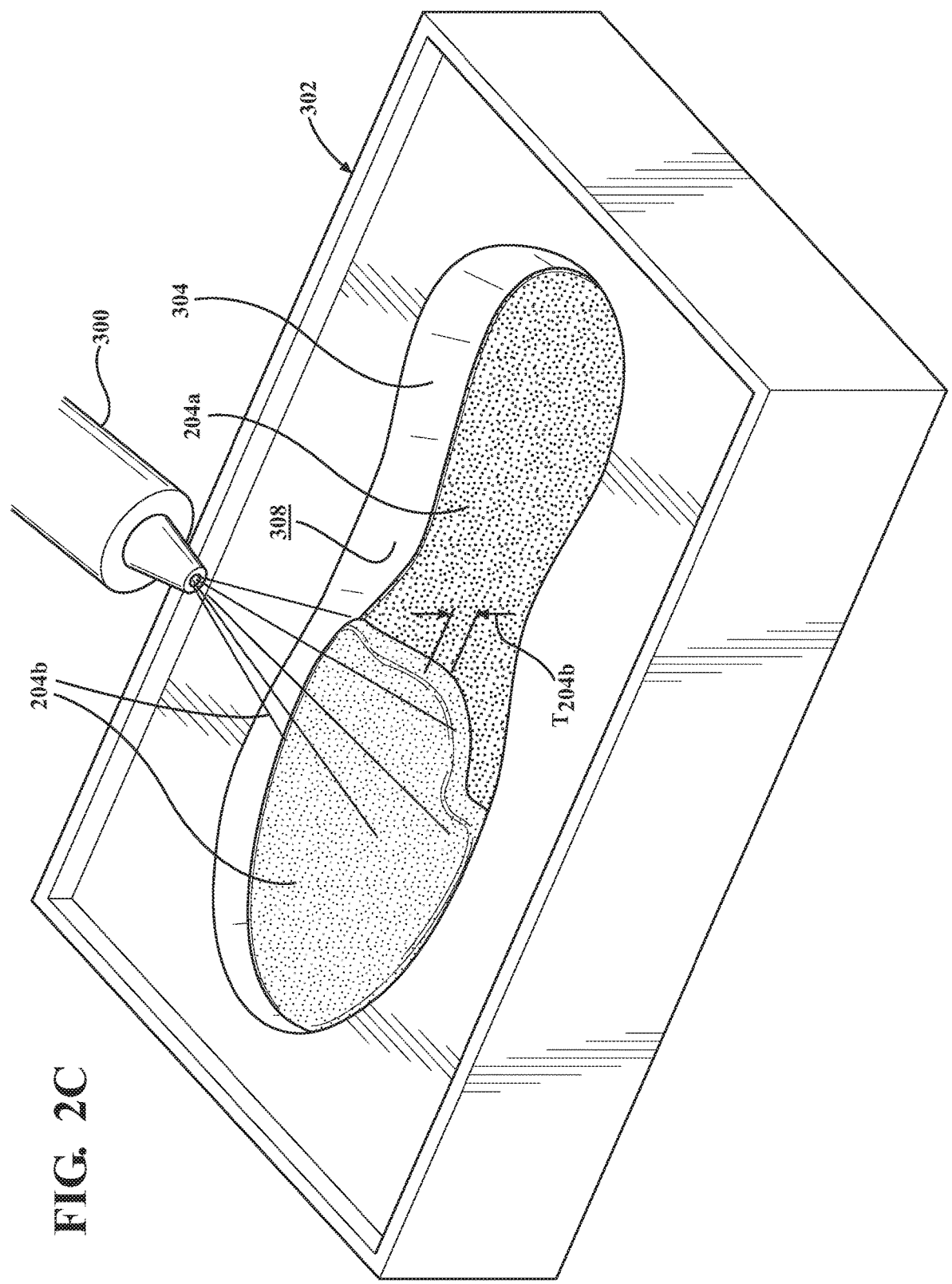
FIG. 2C is a perspective view of another step of the method of producing the sole structure of FIG. 1, showing a second outsole material being provided to the mold cavity.

Referring to FIG. 2C, a second outsole material 204b may optionally be deposited within the mold cavity 304, in addition to the first outsole material 204a. Like the first outsole material 204a, the second outsole material 204b is deposited within the mold cavity 304 in an uncured, fluid state. Here, the second outsole material 304b may be applied over top of the first outsole material 204a to form a layered arrangement of the outsole materials 204a, 204b. Accordingly, this may result in a multi-layered outsole 204 having layers formed by the various outsole materials 204a, 204b. Additionally or alternatively, the second outsole material 204b may be provided to regions of the bottom surface 306 of the mold cavity 304 where the first outsole material 204a is not present. Here, the first outsole material 204a will define first regions of the ground-engaging surface 26 and the second outsole material 204b will define second regions of the ground-engaging surface 26.

The first outsole material 204a and the second outsole material 204b are selected to impart desired properties of cushioning, durability, abrasion resistance and traction. Accordingly, the first outsole material 204a may be a different material than the second outsole material 204b. For example, the first outsole material 204a may be configured to provide greater abrasion resistance and durability, while the second outsole material 204b is configured to provide greater cushioning and flexibility. Although the illustrated example shows the first outsole material 204a and the optional second outsole material 204b, additional layers of uncured polymeric outsole materials may be deposited within the mold cavity 304 to form additional layers of the outsole 204.

Thicknesses $T_{204a}$, $T_{204b}$ of the first outsole material 204a and/or the second outsole material 204b within the mold cavity 302 are selected to accommodate for manufacturing processes (e.g., molding) and performance characteristics (e.g., traction, abrasion resistance, cushioning, durability). For example, the first outsole material 204a and/or the second outsole material 204b may be applied with a greater thickness $T_{204a}$ in regions where the molded outsole 204 will have a greater thickness, or where a tread pattern 214 of the outsole 204 may be formed.

Figure 2D:
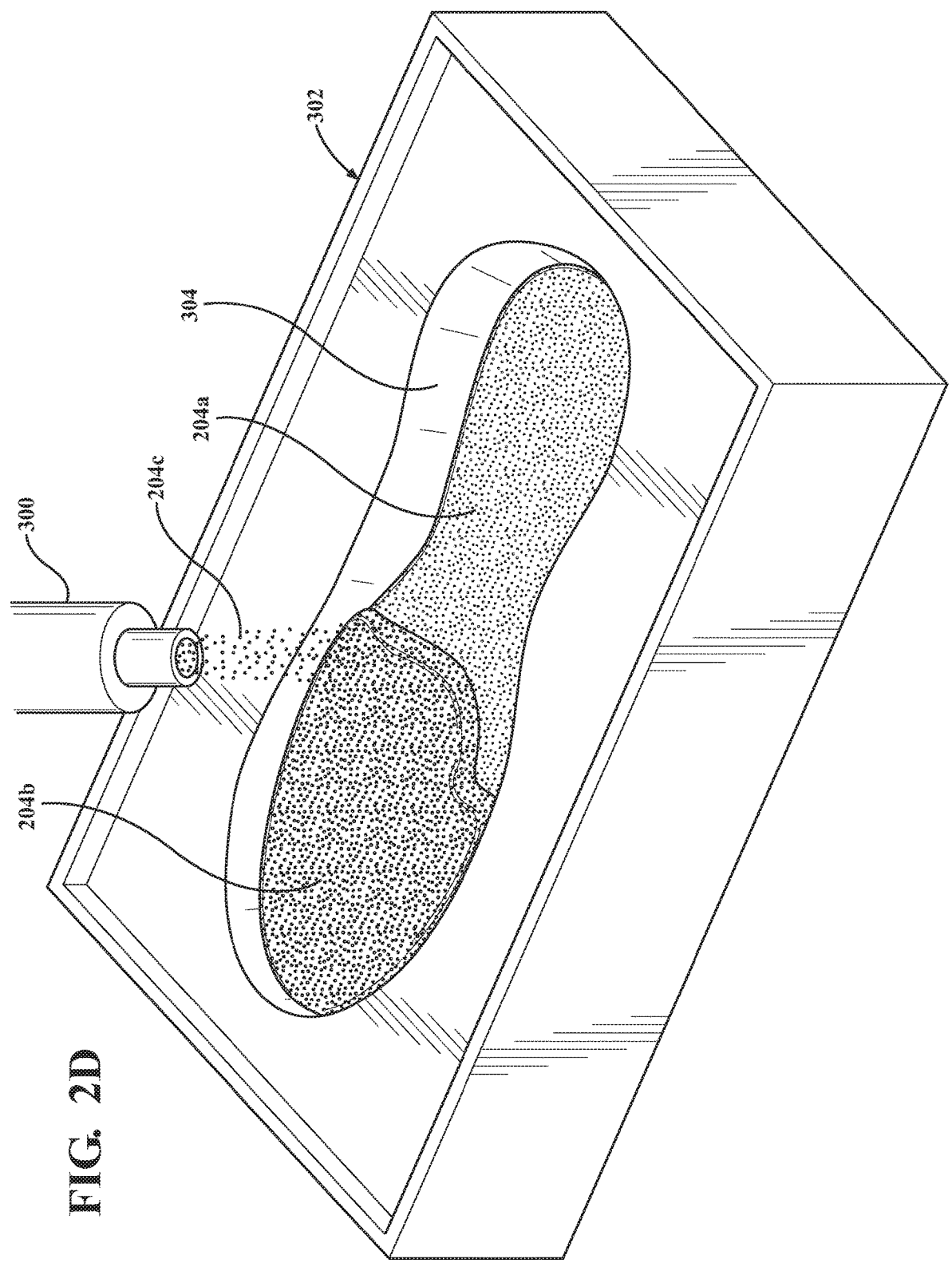
FIG. 2D is a perspective view of another step of the method of producing the sole structure of FIG. 1, showing a particulate additive being provided to the mold cavity.

With reference to FIG. 2D, in another optional step, a third outsole material 204c may be deposited within the mold cavity 304. Unlike the outsole materials 204a, 204b discussed above, which are deposited in an uncured and fluid state, the third outsole material 204c is provided as a particulate additive 204c including cured and reground polymeric materials. For example, the particulate additive 204c may include reground outsole materials collected during the molding process. Here, excess outsole materials from previously molded and cured sole structures may be collected and reground to form at least a portion of the particulate additive 204c. The particulate additive 204c can then be deposited into the mold cavity 304 and ultimately cured within the outsole 204. In some instances, the particulate additive 204c is substantially granular and a grain size is selected to provide desired characteristics to the outsole 204. For example, larger grains may be used so that the particulate additive 204c provides a textured surface to the outsole 204. Additionally or alternatively, small grains may be used where the particulate additive 204c merely functions as a filler material, and does not create a texture on the exterior of the outsole 204.

As shown, the particulate additive 204c is deposited atop the uncured second outsole material 204b. However, in other examples, the particulate additive 204c may be deposited within the mold cavity 304 prior to the first outsole material 204a. In some examples, the particulate additive 204c may be disposed between first outsole material 204a and the second outsole material 204b. Additionally or alternatively, the particulate additive 204c may be pre-mixed within the first outsole material 204a and/or the second outsole material 204b.

In the illustrated example, the outsole materials 204a-204c are illustrated as being provided to the mold cavity 304 using a deposition process, wherein the outsole materials 204a-204c are deposited upon the bottom surface 306 of the mold cavity 304 by the applicator 300. Accordingly, the thicknesses $T_{204a}$, $T_{204}b$ of the first outsole material 204a and the second outsole material 204b, or a concentration of the third outsole material 204c, may be controlled by adjusting operating parameters of the applicator 300, such as a deposition rate, a dwell time, a number of passes, droplet or grain size, and/or an application temperature, for example. In other examples, one or more of the outsole materials 204a-204c may be deposited within the mold cavity 304 using other methods, such as direct application (e.g., brush or roller) or injection.

Although the illustrated example shows the outsole materials 204a-204c being deposited only on the bottom surface 306 of the mold cavity 304, in some examples the outsole materials 204a-204c may be deposited on or applied to a peripheral side surface 308 of the mold cavity 304, such that the outsole materials 204a-204c will extend onto the peripheral side surface 212 of the midsole 202 when the sole structure 200 is molded.

Once the outsole materials 204a-204c are deposited within the mold cavity 304, the midsole preform 202a is placed within the mold cavity 304 adjacent to the one or more outsole materials 204a-204c. Prior to the midsole preform 202a being placed within the mold cavity 304, the uncured outsole materials 204a, 204b may be partially cured within the mold 304. Particularly, the outsole materials 204a, 204b may be cured until the outsole materials 204a, 204b are still wet to the touch, but have a viscosity sufficient to prevent the outsole materials 204a, 204b from flowing within the mold cavity 304 when the mold pressure is applied. The outsole material 204a, 204b may be actively cured using heat or other accelerants, or may be allowed to cure passively.

Figure 2E:
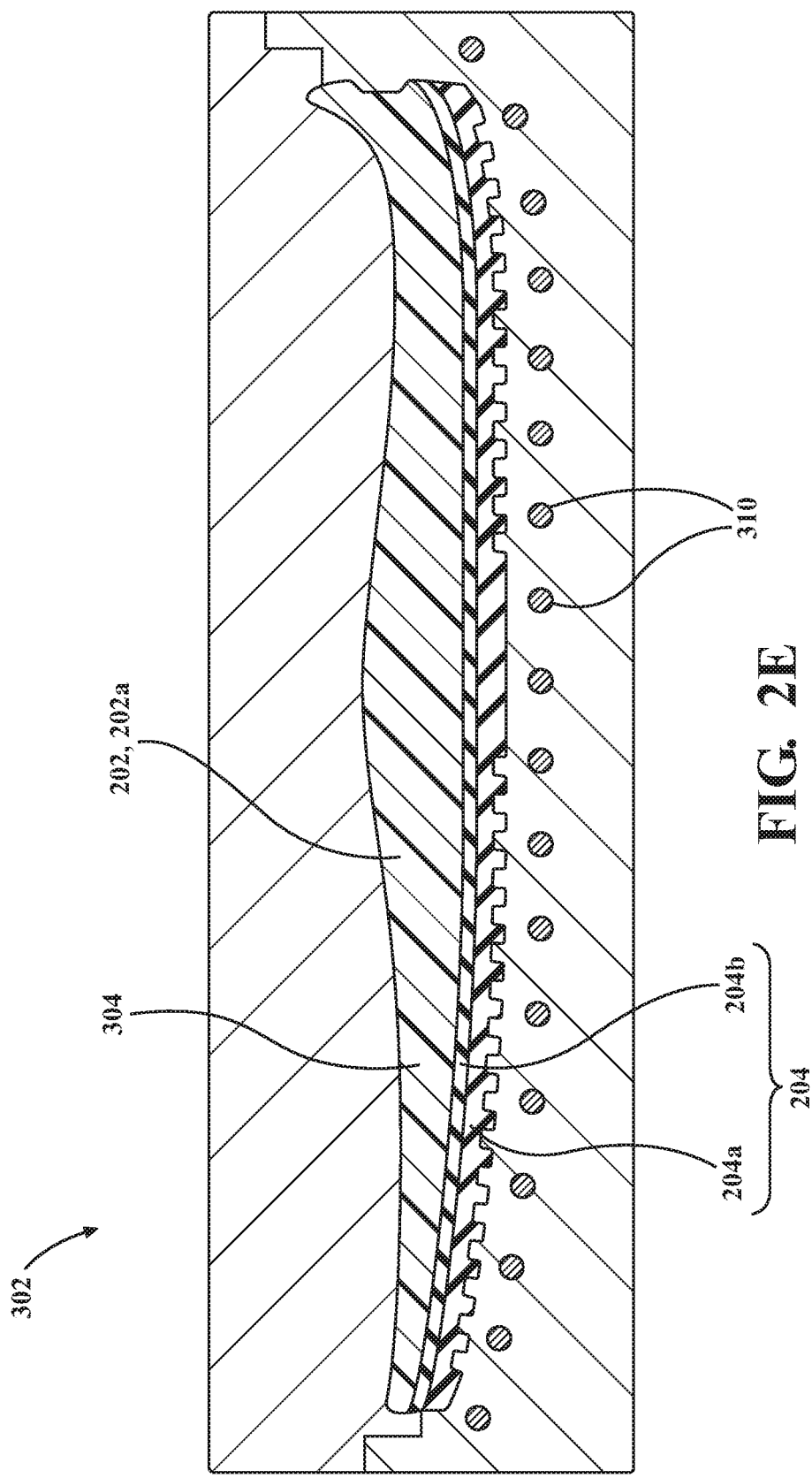
FIG. 2E is a schematic view of another step of the method of producing the sole structure of FIG. 1, showing the sole structure disposed within the mold.
Figure 2F:
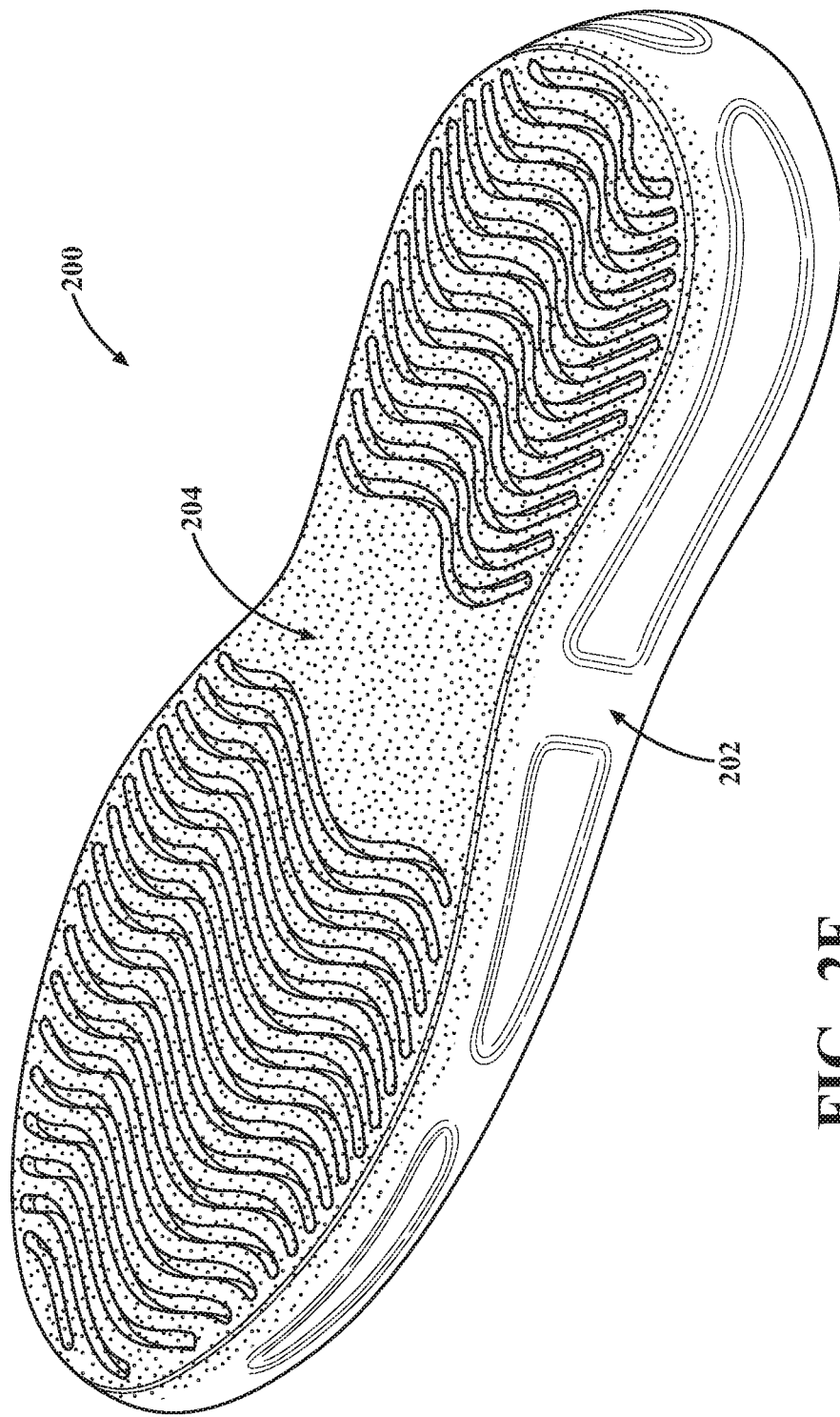
FIG. 2F is a perspective view of another step of a method of producing the sole structure of FIG. 1, showing the sole structure in a molded state.

After the outsole materials 204a, 204b are sufficiently cured, the midsole element 202a and the outsole materials 204a-204c are subjected to a molding process to impart the profile of the sole structure 200. For example, the tread pattern 214 may be formed in the outsole 204 to provide additional grip to the sole structure 200. Here, the molding process is a heated compression molding process, where the sole structure 200 is subjected to heat and pressure by the mold 302a to simultaneously mold the midsole 202 and the outsole 204. Thus, as shown in FIG. 2E, the mold 302a may include heating elements 310.

With the outsole material 204a cured, the sole structure 200 can be removed from the mold 302 and attached to the upper 100 to form the article of footwear 10. Forming the sole structure 200 using the heated compression molding process may cause the outsole 204 to be partially impregnated within the exterior surface 206 of the midsole 202 to provide the sole structure 200 with a substantially integral midsole 202 and outsole 204 structure. This effect is provided by allowing the foam material of the midsole 202 to soften under the effect of heat and pressure, thereby allowing outsole materials 204a-204c to be absorbed within the foam material of the midsole 202.

The following Clauses provide an exemplary configuration for an article of footwear described above.

Clause 1: A method of forming a sole structure for an article of footwear, the method comprising depositing a first outsole material including a first uncured polymeric material upon a mold surface of a mold cavity; disposing a midsole element adjacent to the first outsole material within the mold cavity; and subjecting the first outsole material and the midsole element to a molding process to form the sole structure having an outsole and a midsole.

Clause 2: The method of Clause 1, wherein depositing a first outsole material includes spraying a first outsole material upon the mold surface of the mold cavity.

Clause 3: The method of Clause 1, wherein depositing a first outsole material includes depositing a first outsole material upon a bottom surface of the mold cavity.

Clause 4: The method of Clause 1, further comprising depositing a second outsole material including a second uncured polymeric material within the mold cavity.

Clause 5: The method of Clause 4, wherein the first uncured polymeric material is different from the second uncured polymeric material.

Clause 6: The method of Clause 1, further comprising depositing a third outsole material including a particulate additive within the mold cavity.

Clause 7: The method of Clause 1, wherein the first outsole material is an uncured polyurethane.

Clause 8: The method of Clause 7, wherein the first outsole material is an uncured polyurea.

Clause 9: The method of Clause 1, wherein the midsole element includes a foamed polymeric material.

Clause 10: The method of Clause 1, wherein the molding process is a compression molding process.

Clause 11: A method of forming a sole structure for an article of footwear, the method comprising spraying a first outsole material including a first uncured polymeric material upon a mold surface of a mold cavity; disposing a midsole element adjacent to the first outsole material within the mold cavity; and subjecting the midsole element and the first outsole material to a molding process to form the first outsole material into an outsole and the midsole element into a midsole.

Clause 12: The method of Clause 11, wherein spraying a first outsole material includes spraying a first outsole material upon a bottom surface of the mold cavity.

Clause 13: The method of Clause 11, further comprising spraying a second outsole material including a second uncured polymeric material within the mold cavity.

Clause 14: The method of Clause 13, wherein the first uncured polymeric material is different from the second uncured polymeric material.

Clause 15: The method of Clause 11, further comprising depositing a particulate additive within the mold cavity.

Clause 16: The method of Clause 11, wherein the first outsole material is an uncured polyurethane.

Clause 17: The method of Clause 16, wherein the first polymeric material is polyurea.

Clause 18: The method of Clause 11, wherein the midsole element includes a foamed polymeric material.

Clause 19: The method of Clause 11, wherein the midsole element is a midsole preform.

Clause 20: The method of Clause 11, wherein the molding process is a compression molding process.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A method of forming a sole structure for an article of footwear, the method comprising:
    depositing a first outsole material including a first uncured polymeric material upon a mold surface of a mold cavity;
    depositing a particulate additive onto the first outsole material, the particulate additive including reground outsole materials;
    disposing a midsole preform adjacent to the first outsole material within the mold cavity; and
    subjecting the first outsole material and the midsole preform to a molding process to form the sole structure having an outsole and a midsole.

2. The method of claim 1, wherein depositing a first outsole material includes spraying a first outsole material upon the mold surface of the mold cavity.

3. The method of claim 1, wherein depositing a first outsole material includes depositing a first outsole material upon a bottom surface of the mold cavity.

4. The method of claim 1, further comprising depositing a second outsole material including a second uncured polymeric material onto the first outsole material.

5. The method of claim 4, wherein the first uncured polymeric material is different from the second uncured polymeric material.

6. The method of claim 1, further comprising depositing a third outsole material including the particulate additive onto the first outsole material.

7. The method of claim 1, wherein the first outsole material is an uncured polyurethane.

8. The method of claim 7, wherein the first outsole material is an uncured polyurea.

9. The method of claim 1, wherein the midsole preform includes a foamed polymeric material.

10. The method of claim 1, wherein the molding process is a compression molding process.

11. A method of forming a sole structure for an article of footwear, the method comprising:
    spraying a first outsole material including a first uncured polymeric material upon a mold surface of a mold cavity;
    spraying a second outsole material including a second uncured polymeric material onto the first outsole material;
    disposing a midsole preform adjacent to the first outsole material within the mold cavity; and
    subjecting the midsole preform and the first outsole material to a molding process to form the first outsole material into an outsole and the midsole preform into a midsole.

12. The method of claim 11, wherein spraying a first outsole material includes spraying a first outsole material upon a bottom surface of the mold cavity.

13. The method of claim 11, wherein the first uncured polymeric material is different from the second uncured polymeric material.

14. The method of claim 11, further comprising depositing a particulate additive onto the first outsole material.

15. The method of claim 11, wherein the first outsole material is an uncured polyurethane.

16. The method of claim 15, wherein the first polymeric material is polyurea.

17. The method of claim 11, wherein the midsole preform includes a foamed polymeric material.

18. The method of claim 11, wherein the molding process is a compression molding process.

* * * * *